(12) United States Patent
Xu

(10) Patent No.: US 6,846,020 B2
(45) Date of Patent: Jan. 25, 2005

(54) SEAT BELT RESTRAINT SYSTEM FOR BOTH ADULTS AND CHILDREN

(76) Inventor: Zhaoxia Xu, 4694 Sycamore Dr., Ypsilanti, MI (US) 48197

( * ) Notice: Subject to any disclaimer, the term of this patent is extended or adjusted under 35 U.S.C. 154(b) by 18 days.

(21) Appl. No.: 10/256,896

(22) Filed: Sep. 28, 2002

(65) Prior Publication Data

US 2004/0061323 A1 Apr. 1, 2004

(51) Int. Cl.[7] .......................... B60R 22/20; B60R 22/26
(52) U.S. Cl. .................. 280/808; 280/801.1; 280/801.2
(58) Field of Search .............................. 280/808, 801.2, 280/801.1; 297/473, 483, 485, 486; B60R 22/20, 22/26

(56) References Cited

U.S. PATENT DOCUMENTS

| | | | | |
|---|---|---|---|---|
| 4,236,755 A | * | 12/1980 | Pollitt et al. ................. | 297/483 |
| 4,796,919 A | | 1/1989 | Linden | |
| 4,799,737 A | | 1/1989 | Greene | |
| 4,832,366 A | * | 5/1989 | Corbett et al. .............. | 280/808 |
| 4,951,965 A | | 8/1990 | Brown | |
| 5,308,116 A | * | 5/1994 | Zawisa et al. ............... | 280/808 |
| 5,335,957 A | | 8/1994 | Golder | |
| 5,609,367 A | * | 3/1997 | Eusebi et al. ............... | 280/808 |
| 5,931,503 A | | 8/1999 | Glendon | |
| 5,979,991 A | * | 11/1999 | Lewandowski et al. ..... | 297/483 |
| 6,325,417 B1 | * | 12/2001 | Lake .......................... | 280/808 |
| 2002/0167213 A1 | * | 11/2002 | Warner et al. .............. | 297/483 |

FOREIGN PATENT DOCUMENTS

| JP | 06344858 A | * | 12/1994 |
|---|---|---|---|
| JP | 20002-19576 A | * | 1/2002 |

* cited by examiner

Primary Examiner—Ruth Ilan

(57) ABSTRACT

A seat belt restraint system for a vehicle occupant (30) seated in a vehicle seat (32), more specifically for both an adult and a child or a person of small stature. The seat belt restraint system includes a conventional three-point seat belt restraint system (40) for an occupant of normal size and an adjusting mechanism (56) adapted to provide additional fixation points on seat belt webbing (46), more specifically on shoulder belt (54), and adapted to adjust the departure angle at which shoulder belt (54) extends across the body of a child or a person of small stature.

6 Claims, 7 Drawing Sheets

SEAT BELT RESTRAINT SYSTEM FOR BOTH ADULTS AND CHILDREN

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention generally relates to seat belt restraint systems. More specifically, this invention relates to seat belt restraint systems for both adults and children.

2. Prior Art

Vehicle occupant restraints, including seat belt devices and systems, are important and well-known components of vehicle safety systems. When a vehicle experiences severe impact, a properly belted-in occupant is held in place by the webbing, thereby avoiding many serious, if not fatal, physical collisions with vehicle interior and/or being thrown from the vehicle. Since their introduction seat belts have saved countless lives and reduced the severity of injury in countless more.

Three-point seat belt systems are widely used and well known. There are three fixation points on the seat belt webbing. The upper end of the shoulder belt is extendable and retractable to the upper portion of the vehicle adjacent the shoulder of an occupant of normal size, providing the first fixation point. The lower end of the shoulder belt extends to a lap belt via a sliding seat belt latch. One end of the lap belt is continuously connected to the lower end of the shoulder belt. The other end is anchored to the vehicle and disposed on the outboard side of the occupant, resulting in the second fixation point. The seat belt latch has a webbing loop, through which the lap belt is threaded, such that the seat belt latch is slidable along the lap belt, and a tongue plate engageable with a seat belt buckle. The seat belt buckle is anchored to the vehicle and disposed on the inboard side of the occupant, generating the third fixation point. Three-point seat belt restraint systems improve the performance of occupant restraint over two-point seat belt restraint systems by restricting both the occupant's upper and lower body motions.

Many patents have been issued to three-point seat belt restraint systems. However, existing three-point seat belt restraint systems have an important drawback when used by a child or a person of small stature. The shoulder belt would run across the child's head, neck, or above. Some children have placed the shoulder belt behind their back. Obviously, this position diminishes any benefit that could be derived from the shoulder belt. Even worse, in vehicles equipped with an airbag, the child, who is not restrained or who is improperly restrained, is potentially an out-of-position occupant.

Children have used booster chairs. However, customers incur added costs in buying booster chairs. Booster chairs also add weight to vehicles. On the other hand, when children grow bigger, they are getting reluctant to sit in booster chairs. As a result, some children either simply do not wear a seat belt or just wear a lap belt. Some patents have been issued in designing seat belt restraint systems or devices for children.

U.S. Pat. No. 5,609,367, issued to Eusebi et al., on Mar. 11, 1997, describes a device for adjusting the height of the web guide to change the departure angle of the shoulder belt from the restraint point across a seated child. A second web guide is mounted on a vertically movable height adjuster. The second web guide has an open slot to receive the shoulder belt.

Although the device can effectively adjust the departure angle of the shoulder belt across the seated child and improve the comfort and safety performance for children, it might incur too big added cost in manufacturing, because making a vertically movable height adjuster with desired strength for vehicle safety on the lower B-pillar or on the side of vehicle seat is going to be costly. The space in between the vehicle seat and the B-pillar is very limited. A web guide mounted on a height adjuster would take out even more space. Also, the proposed device is using the same attachment space as the seat mounted side impact airbag. Therefore, it may not be used in the vehicles equipped with side impact airbags. Side impact airbags have become standard safety components for many vehicles in recent years.

U.S. Pat. No. 5,335,957, issued to Golder, on Aug. 9, 1994, describes a device having a tubular passageway for receiving and engaging portions of both the shoulder and the lap belt.

This device restricts the angle between the shoulder belt and the lap belt thereby avoiding the interference between the shoulder belt and the child's head and improving the comfort of wearing the seat belt restraint system, However, if the tubular passageway is made shorter for convenience of carrying, the shoulder belt would be very close to the child's head and will slap onto the child's head in a vehicle accident. On the other hand, if the tubular passageway is made longer for safety concern, it is going to be too large to carry around. Further more, in a vehicle accident when the shoulder belt is in tension, the tubular passageway would naturally be forced to slide inboard and the angle between the shoulder belt and the lap belt would become bigger, thereby diminishing the effectiveness of this device. Most important of all, when this device receives and engages portions of both the shoulder and lap belts in keeping the shoulder belt away from the seated child's head, it lifts up the lap belt. This will increase the risk of occupant "submarine", that's occupant sliding under the lap belt.

There are some other add-on products on the market. Unfortunately, these products are primarily for comfort instead of for safety.

Therefore, it remains desirable to provide a seat belt restraint system that is safer, more comfortable and convenient to use, and simpler and less expensive to manufacture, for children or people of small stature.

BRIEF SUMMARY OF THE INVENTION

Accordingly, the present invention is a seat belt restraint system having a conventional three-point seat belt restraint system and an adjusting mechanism for use by a vehicle occupant, more specifically, by either an adult or a child.

The adjusting mechanism includes a plurality of buckle members anchored to the vehicle and disposed on the seatback, distributed in a vertical orientation, and a latch member having a webbing loop, through which the shoulder belt is threaded, such that the latch member is slidable along the shoulder belt, and a tongue plate engageable with one of the buckle members.

Accordingly, several objects and advantages of the present invention are:

(a) to provide a seat belt restraint system which can be used by either an adult of various sizes or a child;

(b) to provide a seat belt restraint system for adults of various sizes or children with superior restraint performance and comfort, thereby encouraging its application and seat belt usage; and (c) to provide a seat belt restraint system with better restraint performance for small children or infants in various car seats.

Other objects and advantages are:

(a) to provide a seat belt restraint system which can be easily reconfigured to a regular seat belt restraint system for use by an adult of normal size. The proposed adjusting mechanism can be an add-on device or part of a integrated seat belt restraint system;

(b) to provide a seat belt restraint system adjusting mechanism which has minimum incremental weight increase; and (c) to provide a seat belt restraint system adjusting mechanism which is simple and inexpensive to manufacture.

Further more features and advantages of the present invention will be readily appreciated, as the same becomes better understood after reading the subsequent description when considered in connection with the accompanying drawings.

BRIEF DESCRIPTION OF THE DRAWING—FIGURES

BRIEF DESCRIPTION OF THE DRAWING—REFERENCE NUMERALS

| | |
|---|---|
| 30 | vehicle occupant |
| 32 | vehicle seat |
| 34 | seatback |
| 36 | seat portion |
| 38 | headrest |
| 40 | three-point seat belt restraint system |
| 42 | seat belt retractor |
| 44 | seat belt buckle |
| 46 | seat belt webbing |
| 48 | seat belt latch |
| 50 | web guide |
| 52 | lap belt |
| 54 | shoulder belt |
| 56 | adjusting mechanism |
| 58 | buckle member |
| 58' | buckle member |
| 60 | latch member |
| 60a | webbing loop |
| 60b | tongue plate |
| 60c | open slot |
| 62 | buckle member sink |
| 62' | buckle member sink |
| 64 | seatback structural member |
| 66 | belt ring |
| 66' | belt ring |
| 68 | connect plate |
| 68a | webbing loop |
| 68b | webbing loop |
| 68c | open slot |
| 68d | open slot |
| 70 | belt ring sink |
| 70' | belt ring sink |
| 72 | adapting plate |
| 72a | webbing loop |
| 72b | open slot |
| 74 | adapting plate sink |
| 74' | adapting plate sink |

DETAILED DESCRIPTION OF THE INVENTION

Figure 1:
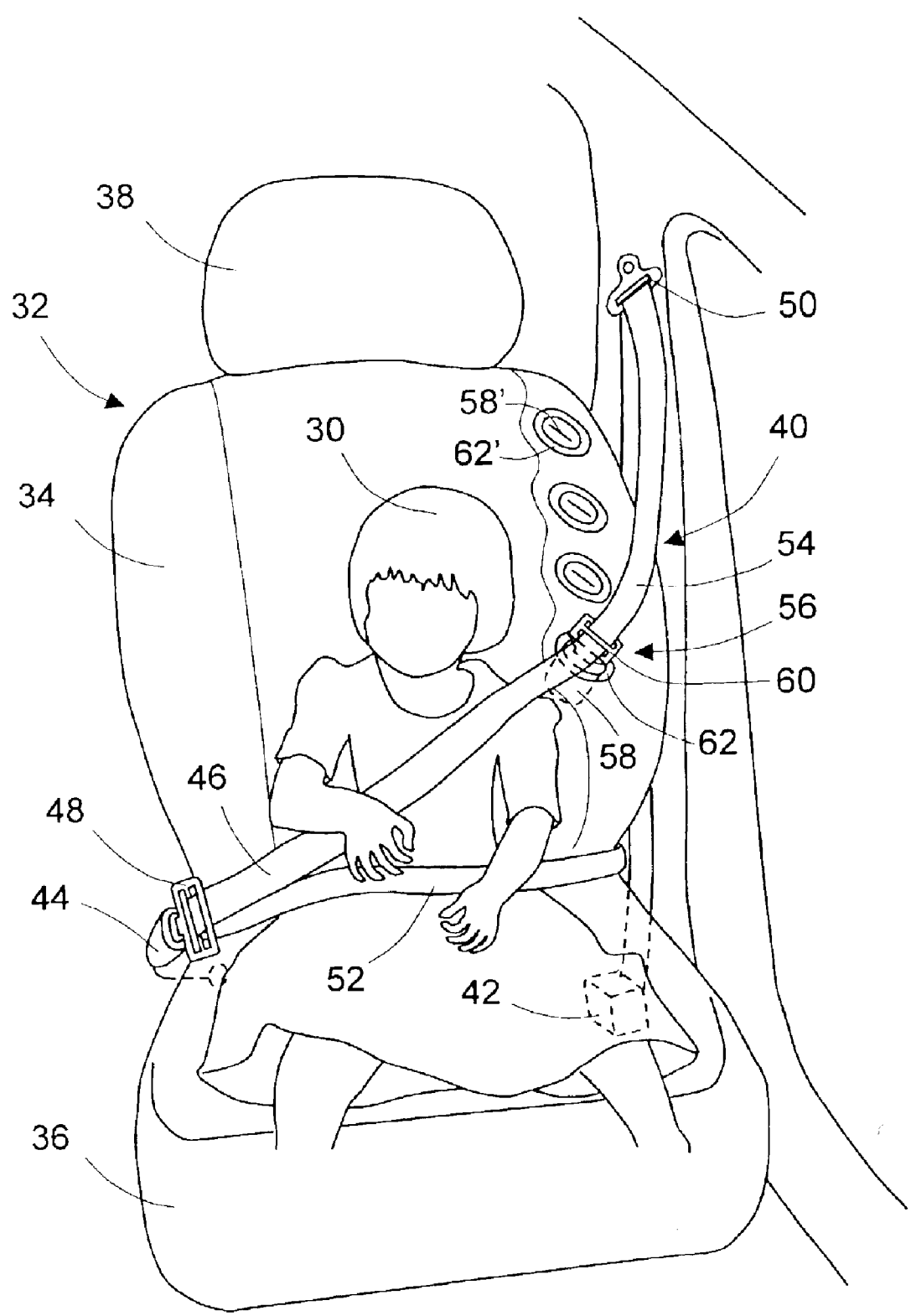
FIG. 1 illustrates an embodiment of the present invention.

Reference is made to FIG. 1, which illustrates an embodiment of the present invention. As shown in FIG. 1, a vehicle occupant 30, a small child, is seated in a conventional vehicle seat 32. Vehicle seat 32 has a seatback 34, a seat portion 36, and a headrest 38. Also shown in FIG. 1 is a conventional three-point seat belt system 40, which, as seen below, is modified by the present invention for children or people of small stature.

Seat belt restraint system 40 comprises a seat belt retractor 42, a seat belt buckle 44, a length of seat belt webbing, generally shown as 46, a seat belt latch 48, and a web guide 50.

Seat belt retractor 42 is secured to the vehicle. Seat belt buckle 44 is anchored to the lower portion of the vehicle on the inboard side of seated occupant 30. Seat belt webbing 46 is separated into a lap belt 52 and a shoulder belt 54, in a known manner. Seat belt latch 48 has a webbing loop; through which seat belt webbing 46 is threaded, and a tongue plate engageable with seat belt buckle 44. Web guide 50 is secured to the upper portion of the vehicle adjacent the shoulder of an occupant of normal size.

The upper end of shoulder belt 54 extends to web guide 50 and further extends to seat belt retractor 42. The lower end of shoulder belt 54 extends to one end of lap belt 52 via seat belt latch 48. The other end of lap belt 52 is anchored to the lower portion of the vehicle on the outboard side of occupant 30. Shoulder belt 54 would typically run across the head and neck or above of occupant 30. This deficiency is corrected by the present invention.

In the present invention, an adjusting mechanism 56 is provided to modify seat belt restraint system 40. As shown in FIG. 1, adjusting mechanism 56 comprises a buckle member 58 and a latch member 60.

Figure 2:
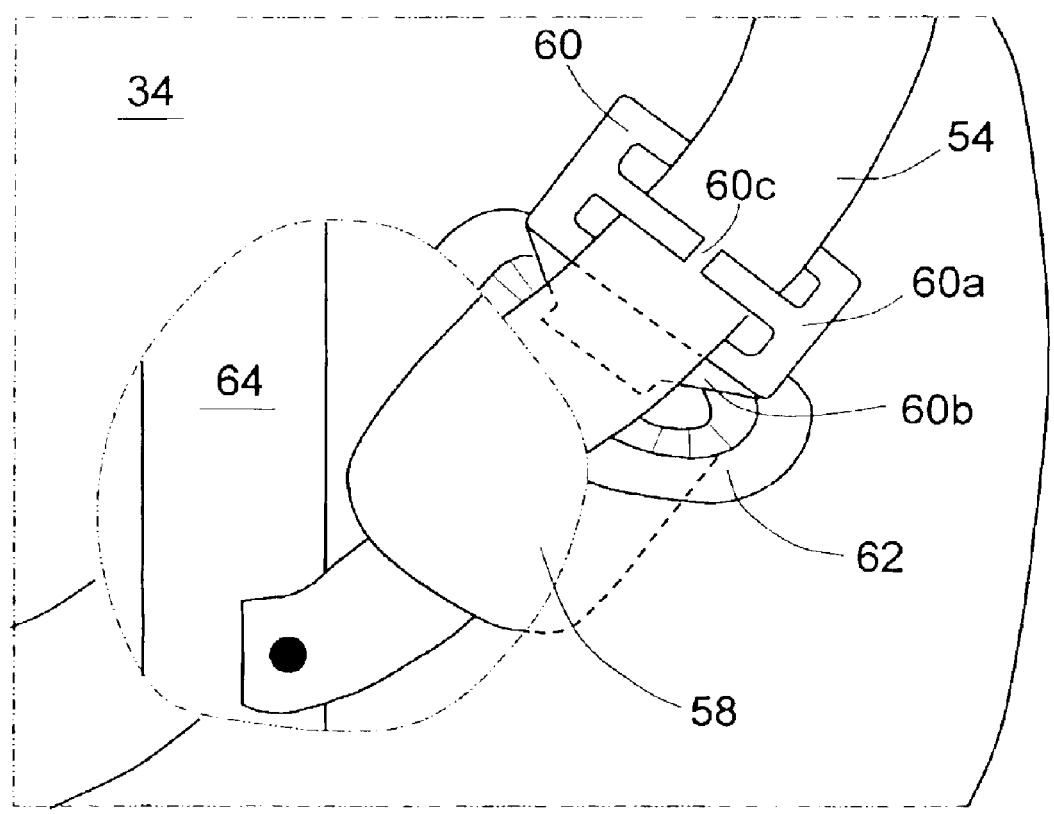
FIG. 2 illustrates an exploded view of the adjusting mechanism in FIG. 1.

FIG. 2 illustrates an exploded view of adjusting mechanism 56 in more details. Buckle member 58 is anchored to the vehicle on seatback 34. Latch member 60 has a webbing loop 60*a*, through which shoulder belt 54 is threaded, such that latch member 60 is slidable along shoulder belt 54, and a tongue plate 60*b* engageable with buckle member 58.

Buckle member 58 is anchored to the vehicle on seatback 34. To be more specific, it is anchored to seatback structural member 64, and sinks into the cushion of seatback 34. A buckle member sink 62 is provided here for buckle member 58. A cover plate (not shown) can be provided to cover up buckle member sink 62 when buckle member 58 is no longer desired.

An open slot 60*c* is provided on webbing loop 60*a* to permit shoulder belt 54 to slide in and out. Thus when latch member 60 is no longer desired it can be removed from shoulder belt 54. Open slot 60*c* is specially designed to minimize its width to avoid excessive weakening of webbing loop 60*a*. Webbing loop 60*a* should be strong enough to withstand the belt loading during a vehicle accident. Some beads or darts (not shown) can be added on webbing loop 60*a* to avoid shoulder belt 54 sliding out during an accident.

A plurality of buckle members, generally shown as 58', is provided for multi-point adjustment. These buckle members are anchored to the vehicle on seatback 34. To be more specific, these buckle members are anchored to seatback structural member 64 and sink into the cushion of seatback 34. These buckle members are distributed on seatback 34 in a vertical orientation. The lower buckle members can be slightly closer to the centerline of seatback 34 because lower buckle members are for smaller children and their sizes are smaller. A plurality of buckle member sinks, generally shown as 62', is provided here for these buckle members. A plurality of cover plates (not shown) can be provided to cover up unused buckle member sinks.

When latch member 60 is engaged with buckle member 58, an additional fixation point is provided for seat belt webbing 46. This additional fixation point is at a height level better suiting the size of occupant 30. Shoulder belt 54 for use by adults of normal size will, now, extends across the shoulder of occupant 30 of relative small stature. Latch member 60 allows shoulder belt 54 to run through but the position of this fixation point will not change. Therefore, safety and comfort with wearing this seat belt restraint system of the present invention, by children or people of small stature, are apparent.

In operation, when vehicle occupant 30 is seated in vehicle seat 32 with seat belt latch 48 locked onto seat belt buckle 44, occupant 30 or the parent of occupant 30 moves shoulder belt 54 away from its original position and slides shoulder belt 54 into open slot 60*c* and then locks latch member 60 into one of the buckle members, thereby repositioning shoulder belt 54, such that shoulder belt 54 will lie across the shoulder of occupant 30. Once the position of this fixation point is set-up, an adjustment is not necessary until occupant 30 grows beyond this size or another occupant of different size is using this seat belt restraint system. Adjustment is simple and convenient.

Figure 3:
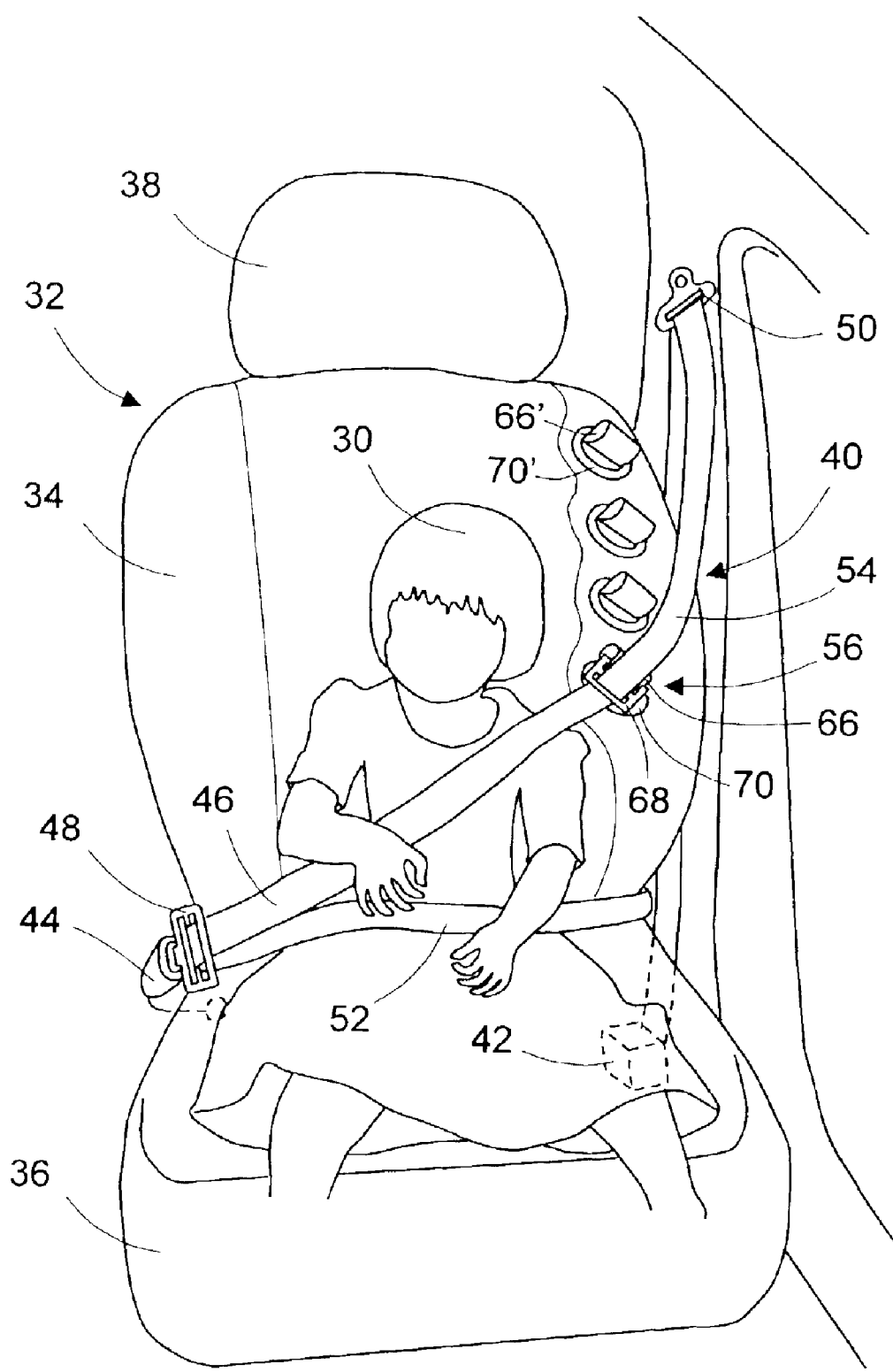
FIG. 3 illustrates an alternative embodiment of the present invention.

Reference is made to FIG. 3, which illustrates an alternative embodiment of the present invention. An adjusting mechanism 56 is provided to modify seat belt restraint system 40. As shown in FIG. 3, adjusting mechanism 56 comprises a belt ring 66 and a connect plate 68.

Figure 4:
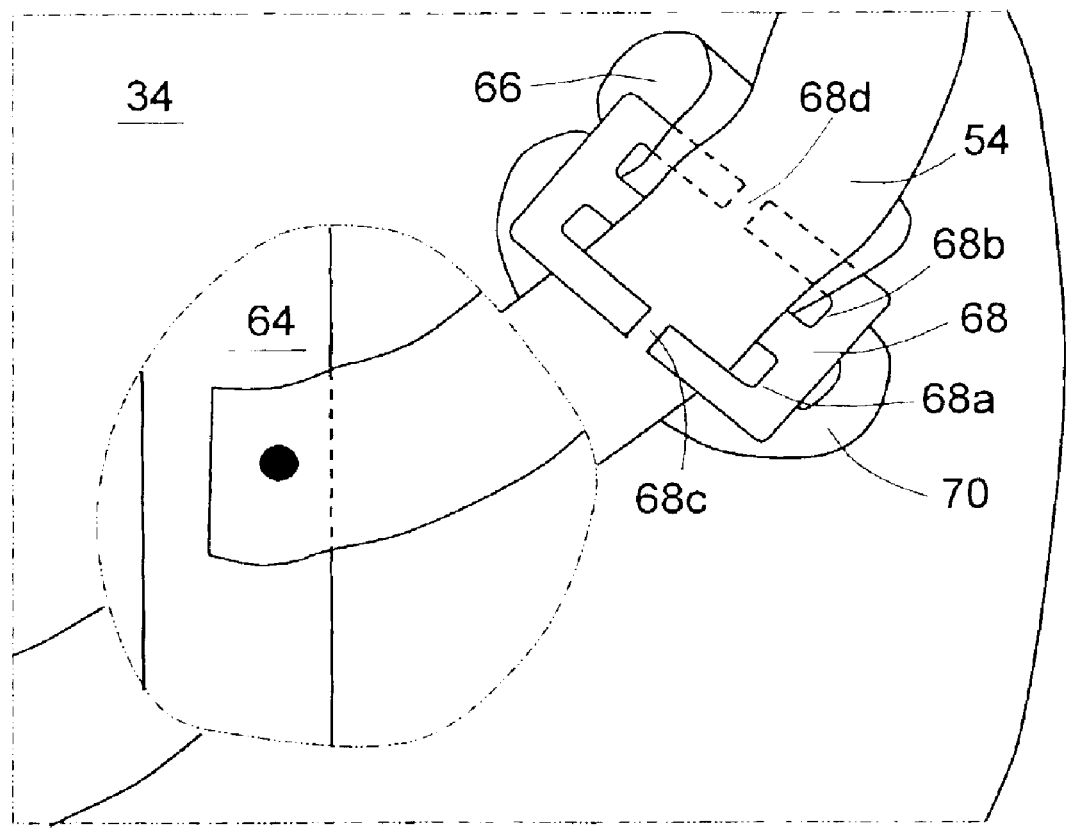
FIG. 4 illustrates an exploded view of the adjusting mechanism in FIG. 3.

FIG. 4 illustrates an exploded view of adjusting mechanism 56 in more details. Belt ring 66 is anchored to the vehicle on seatback 34. To be more specific, Belt ring 66 is anchored to seatback structural member 64, and sinks into the cushion of seatback 34. Connect plate 68 interconnects shoulder belt 54 and belt ring 66. Connect plate 68 has two webbing loops, 68*a* and 68*b*. Through webbing loop 68*a*, shoulder belt 54 is threaded; such that connect plate 68 is slidable along shoulder belt 54. Through webbing loop 68*b*, belt ring 66 is threaded.

There is an open slot 68*c* on webbing loop 68*a* to allow shoulder belt 54 to slide in and out. Open slot 68*c* is specially designed to minimize its width to avoid excessive weakening of webbing loop 68*a*. Webbing loop 68*a* should be strong enough to withstand the belt loading during a vehicle accident. Some beads or darts (not shown) can be added on webbing loop 68*a* to avoid shoulder belt 54 sliding out during an accident. There is an open slot 68*d* on webbing loop 68*b* to allow belt ring 66 to slide in and out. Open slot 68*d* is specially designed to minimize its width to avoid excessive weakening of webbing loop 68*b*. Webbing loop 68*b* should be strong enough to withstand the belt ring loading during a vehicle accident. Some beads or darts (not shown) can be added on webbing loop 68*b* to avoid belt ring 66 sliding out during an accident. A belt ring sink 70 is provided for belt ring 66. A cover plate (not shown) can be provided to cover up belt ring sink 70 when belt ring 66 is no longer desired. A plurality of belt rings, generally shown as 66', is provided for multi-point adjustment. These belt rings are anchored to the vehicle on seatback 34. To be more specific, these belt rings are anchored to seatback structural member 64 and sink into the cushion of seatback 34. These belt rings are distributed on seatback 34 in a vertical orientation. The lower belt rings can be slightly closer to the centerline of seatback 34 because lower belt rings are for smaller children and their sizes are smaller. A plurality of belt ring sinks, generally shown as 70', is provided here for these belt rings. A plurality of cover plates (not shown) can be provided to cover up unused belt ring sinks.

When connect plate 68 is attached to both shoulder belt 54 and belt ring 66, an additional fixation point is provided for seat belt webbing 46. This additional fixation point is at a height level better suiting the size of occupant 30. Shoulder belt 54 for use by adults of normal size will, now, extends across the shoulder of occupant 30 of relative small stature. Connect plate 68 will allow shoulder belt 54 to run through but the position of this fixation point will not change. Therefore, safety and comfort with wearing this seat belt restraint system of the present invention, by children or people of small stature, are apparent.

In operation, when vehicle occupant 30 is seated in vehicle seat 32 with seat belt latch 48 locked onto seat belt buckle 44, occupant 30 or the parent of occupant 30 moves shoulder belt 54 away from its original position and slides shoulder belt 54 into open slot 68c on connect plate 68 and then slides one of the belt rings into open slot 68d, thereby repositioning shoulder belt 54, such that shoulder belt 54 will lie across the shoulder of occupant 30. Once the position of this fixation point is set-up, an adjustment is not necessary until occupant 30 grows beyond this size or another occupant of different size is using this seat belt restraint system. Adjustment is simple and convenient.

Figure 5:
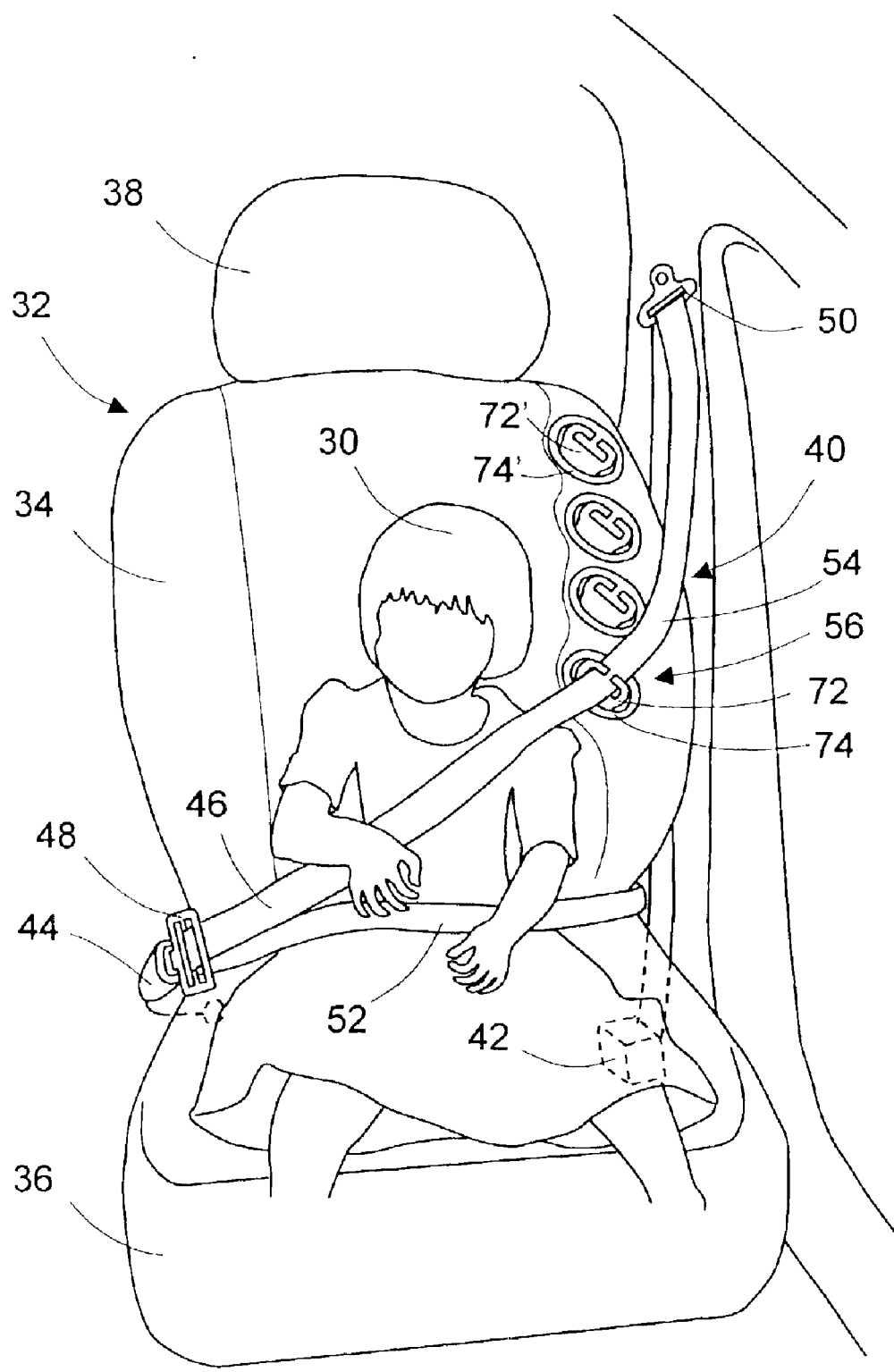
FIG. 5 illustrates another alternative embodiment of the present invention.

Reference is made to FIG. 5, which illustrates another alternative embodiment of the present invention. An adjusting mechanism 56 is provided to modify seat belt restraint system 40. As shown in FIG. 5, adjusting mechanism 56 comprises an adapting plate 72.

Figure 6:
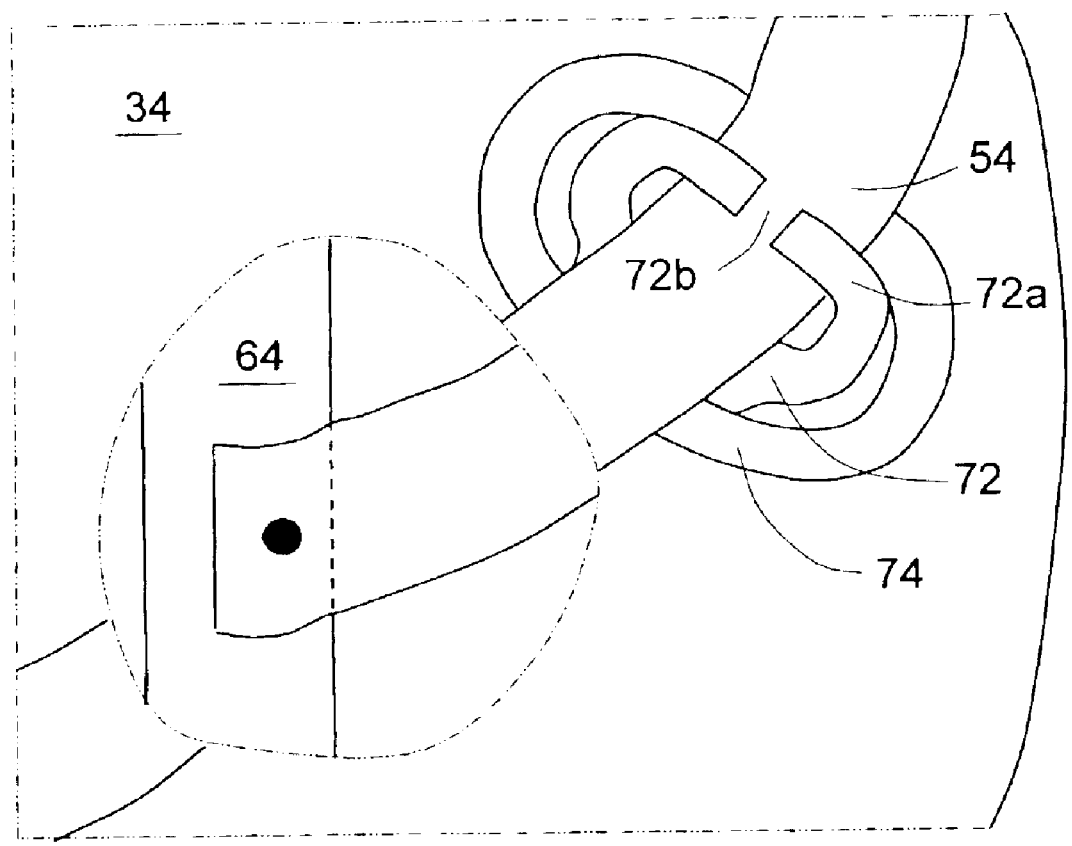
FIG. 6 illustrates an exploded view of the adjusting mechanism in FIG. 5.

FIG. 6 illustrates an exploded view of adjusting mechanism 56 in more details. Adapting plate 72 is anchored to the vehicle on seatback 34. To be more specific, Adapting plate 72 is anchored to seatback structural member 64 and sinks into the cushion of seatback 34. Adapting plate 72 has a webbing loop 72a. Through webbing loop 72a, shoulder belt 54 is threaded. There is an open slot 72b on webbing loop 72a to allow shoulder belt 54 to slide in and out. Open slot 72b is specially designed to minimize its width to avoid excessive weakening of webbing loop 72a. Webbing loop 72a should be strong enough to withstand the belt loading during a vehicle accident. Some beads or darts (not shown) can be added on webbing loop 72a to avoid shoulder belt 54 sliding out during an accident.

An adapting plate sink 74 is provided on the cushion of seatback 34 for adapting plate 72. A cover plate (not shown) can be provided to cover up adapting plate sink 74 when adapting plate 72 is no longer desired.

A plurality of adapting plates, generally shown as 72', is provided for multi-point adjustment. These adapting plates are anchored to the vehicle on seatback 34. To be more specific, these adapting plates are anchored to seatback structural member 64 and sink into the cushion of seatback 34. These adapting plates are distributed on seatback 34 in a vertical orientation. The lower adapting plates can be slightly closer to the centerline of seatback 34 because lower adapting plates are for smaller children and their sizes are smaller. A plurality of adapting plate sinks, generally shown as 74', is provided here for these adapting plates. A plurality of cover plates (not shown) can be provided to cover up unused adapting plate sinks.

When shoulder belt 54 is threaded through webbing loop 72a, an additional fixation point is provided for seat belt webbing 46. This additional fixation point is at a height level better suiting the size of occupant 30. Shoulder belt 54 for use by adults of normal size will, now, extends across the shoulder of occupant 30 of relative small stature. Webbing loop 72a will allow shoulder belt 54 to run through but the position of this fixation point will not change. Therefore, safety and comfort with wearing this seat belt restraint system of the present invention, by children or people of small stature, are apparent.

In operation, when vehicle occupant 30 is seated in vehicle seat 32 with seat belt latch 48 locked onto seat belt buckle 44, occupant 30 or the parent of occupant 30 moves shoulder belt 54 away from its original position and slides shoulder belt 54 into the open slot of one of these adapting plates, thereby repositioning shoulder belt 54, such that shoulder belt 54 will lie across the shoulder of occupant 30. Once the position of this fixation point is set-up, an adjustment is not necessary until occupant 30 grows beyond this size or another occupant of different size is using this seat belt restraint system. Adjustment is simple and convenient.

Figure 7:
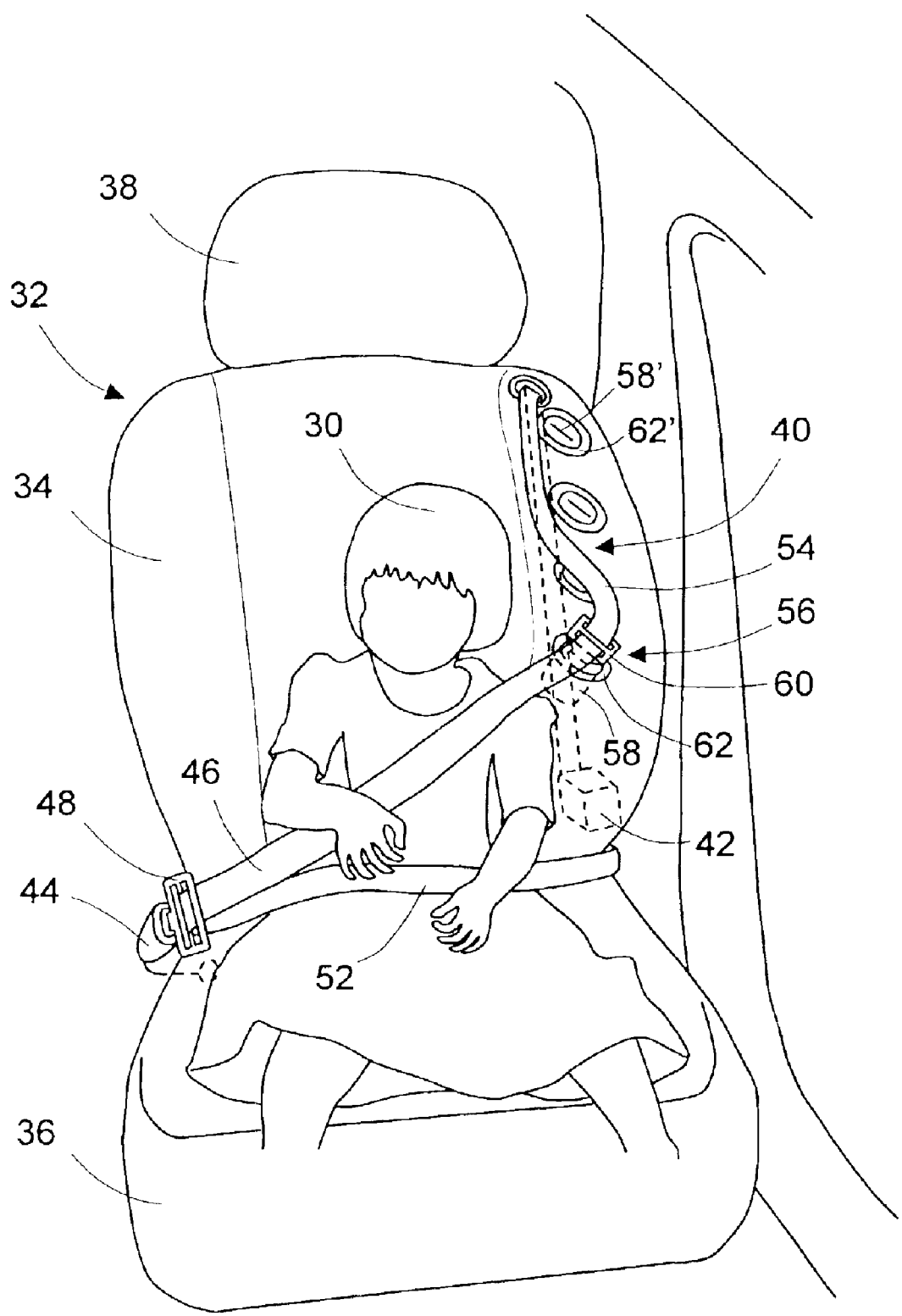
FIG. 7 illustrates a further more alternative embodiment of the present invention.

FIG. 7 illustrates a further more alternative embodiment of the present invention, in which seat belt restraint system 40 is seat mounted. Seat belt retractor 42 is mounted to the vehicle in seatback 34. The upper end of shoulder belt 54 extends to the upper portion of seatback 34 adjacent the shoulder of an occupant of normal size and further extends to seat belt retractor 42. Variations of adjusting mechanism 56 are referred to FIGS. 1–6. Operations are the same as what has been discussed previously.

Accordingly, readers will see that occupants of small stature or children can use this seat belt restraint system of the present invention. This seat belt restraint system is specially designed for both adults and children or people of small stature. It is safe, comfortable, and convenient to use, thereby encouraging its application and seat belt usage. Adjustment to better suit children of different sizes is simple and easy. This seat belt restraint system of the present invention can be used for car seats for infants and small children with added restraint performance. This is because the fixation point on shoulder belt 54 is, now, much closer to car seats. General public can also make use of this seat belt restraint system with added safety performance. This can be achieved by adding a fixation point on the upper portion of seatback 34. The result is that the fixation point is, now, moved from the upper portion of vehicle pillars or roof rails, which are widely used as shoulder belt fixation points, to the upper portion of seatback 34. In summary, additional fixation points are provided on seatback 34 to better suit occupants of various sizes, thereby resulting in comfort of wearing seat belt and added occupant restraint performance.

Although the invention has been described in its preferred forms and structures with a certain degree of particularity, these should not be construed as limiting the scope of the invention but as merely providing illustrations of some of the presently preferred embodiments of this invention.

For examples, although this invention has been described in a preferred form of three-point seat belt restraint system, it can be used in conjunction with other forms of seat belt restraint systems, such as four-point seat belt restraint systems; this can be realized by adding additional adjusting mechanism 56 on the inboard side portion of seatback 34 to adjust the fixation point of inboard side shoulder belt. The description of this invention also addresses specifically vehicle seat belt restraint systems. However, other modes of transportation, such as airplanes, rail trains, ship and cruise, and other seats, such as wheel chairs, can also make use of this invention.

Those skilled in the art can perceive improvements. For examples, obvious improvements can come with the additions of pretension devices (not shown), or energy management devices (not shown), or deployable seat belt webbings and devices (not shown), or any combinations of these devices. Some other obvious improvements can come with variations of adjusting mechanism 56.

Thus it is understood that the present disclosure of the preferred forms can be changed in the details of construction and in the combination and arrangement of parts without departing from the spirit and the scope of the invention as hereinafter claimed.

What I claim as my invention is:

1. A seat belt restraint system for a vehicle occupant in a vehicle seated in a vehicle seat having a seatback, said seat belt restraint system comprising:
    a shoulder belt with a first end adapted to be connected to said vehicle and adapted to be extended from an upper portion of said vehicle adjacent the shoulder of an adult and a second end;
    a lap belt with a first end adapted to be connected to said second end of said shoulder belt and a second end adapted to be anchored to said vehicle and disposed on the outboard side of said vehicle seat;
    a seat belt buckle anchored to said vehicle and disposed on the inboard side of said vehicle seat;
    a seat belt latch having a webbing loop, through which said lap belt is threaded, such that said seat belt latch is slidable along said lap belt, and a tongue plate engageable with said seat belt buckle;
    a buckle member anchored to said vehicle on a seatback structural member and disposed on said seatback;
    a latch member having a webbing loop, through which said shoulder belt is threaded, such that said latch member is slidable along said shoulder belt, and a tongue mechanism engageable with said buckle member.

2. A seat belt restraint system as defined in claim 1, said tongue mechanism is a tongue plate engageable with said buckle member.

3. A seat belt restraint system as defined in claim 1, further including a seat belt retractor associated with said shoulder belt for connecting said first end of said shoulder belt to said vehicle and adapted to be mounted to said vehicle.

4. A seat belt restraint system as defined in claim 1, wherein said webbing loop on said latch member has an open slot of predetermined width to permit said shoulder belt to slide in and out, whereby when no longer desired said latch member can be removed from said shoulder belt.

5. A seat belt restraint system as defined in claim 1, further including a second buckle member anchored to said vehicle on a seatback structural member and disposed on said seatback, whereby one more adjusting position for said shoulder belt is provided.

6. A seat belt restraint system as defined in claim 1, further including a plurality of buckle members anchored to said vehicle on a seatback structural member and disposed on said seatback, whereby more adjusting positions for said shoulder belt are provided.

* * * * *